(12) United States Patent
Chawla et al.

(10) Patent No.: US 7,328,393 B2
(45) Date of Patent: Feb. 5, 2008

(54) FORWARD ERROR CORRECTION IN PACKET NETWORKS

(75) Inventors: Mukul Chawla, San Jose, CA (US); Sarang Wagholikar, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 326 days.

(21) Appl. No.: 10/824,181

(22) Filed: Apr. 13, 2004

(65) Prior Publication Data

US 2005/0229074 A1 Oct. 13, 2005

(51) Int. Cl.
*H03M 13/35* (2006.01)
(52) U.S. Cl. ........................ 714/774; 714/776
(58) Field of Classification Search .............. 714/776, 714/708, 774
See application file for complete search history.

(56) References Cited

U.S. PATENT DOCUMENTS

| | | | | |
|---|---|---|---|---|
| 5,432,787 | A * | 7/1995 | Chethik | 370/473 |
| 5,642,365 | A * | 6/1997 | Murakami et al. | 714/761 |
| 6,061,650 | A * | 5/2000 | Malkin et al. | 704/228 |
| 6,079,042 | A * | 6/2000 | Vaman et al. | 714/755 |
| 6,151,628 | A | 11/2000 | Xu et al. | |
| 6,243,846 | B1 * | 6/2001 | Schuster et al. | 714/776 |
| 6,732,314 | B1 | 5/2004 | Borella et al. | |
| 6,771,674 | B1 * | 8/2004 | Schuster et al. | 370/537 |
| 6,895,019 | B2 * | 5/2005 | Gibson et al. | 370/473 |
| 2003/0023918 | A1 * | 1/2003 | Wu | 714/751 |
| 2003/0226092 | A1 * | 12/2003 | Kim et al. | 714/776 |
| 2003/0229840 | A1 * | 12/2003 | Pattavina | 714/776 |
| 2004/0260863 | A1 * | 12/2004 | Gemmell | 711/100 |
| 2005/0111371 | A1 * | 5/2005 | Miura et al. | 370/242 |
| 2005/0147053 | A1 * | 7/2005 | Saito et al. | 370/252 |
| 2006/0005101 | A1 * | 1/2006 | Li et al. | 714/758 |
| 2006/0039280 | A1 * | 2/2006 | Anandakumar et al. | 370/229 |
| 2006/0156198 | A1 * | 7/2006 | Boyce et al. | 714/774 |
| 2006/0198325 | A1 * | 9/2006 | Gao et al. | 370/270 |

OTHER PUBLICATIONS

Wikipedia, "Tunneling Protocol", 2 pages, Sep. 2006.*
Lui et al., "A System And Method For 2d Packet-Based Forward Error Correction", U.S. Appl. No. 10/439,408, filed May 15, 2003.
Speakman et al., "PGM Reliable Transport Protocol Specification", RFC 3208, http://www.faqs.org/ftp/rfc/pdf/rfc3208.txt.pdf Dec. 2001.
PCT International Search Report dated Sep. 1, 2006; App.#PCT/US05/11799.
PCT Written Opinion dated Sep. 1, 2006; App.#PCT/US05/11799.
Feldmeier, et al., Protocol Boosters, IEEE Journal on Selected Areas in Communications, vol. 16, No. 2, Apr. 1998, pp. 437-444, especially the paragraphs 1-2 of part IIA on p. 438, paragraph 2 of part IID on p. 439, and paragraphs 2-4 of part V on p. 442.

\* cited by examiner

*Primary Examiner*—Stephen M. Baker
(74) *Attorney, Agent, or Firm*—Beyer Weaver LLP

(57) ABSTRACT

Methods and apparatus are provided to allow reliable data transport in a packet-based network. A network node encodes error correction packets associated with data packets at a network-layer and forwards the error correction packets with the data packets. The error correction packets are decoded as needed to recover data packets lost or dropped during transmission. The mechanisms are applicable for unicast and multicast networks and function even with network topology changes.

24 Claims, 14 Drawing Sheets

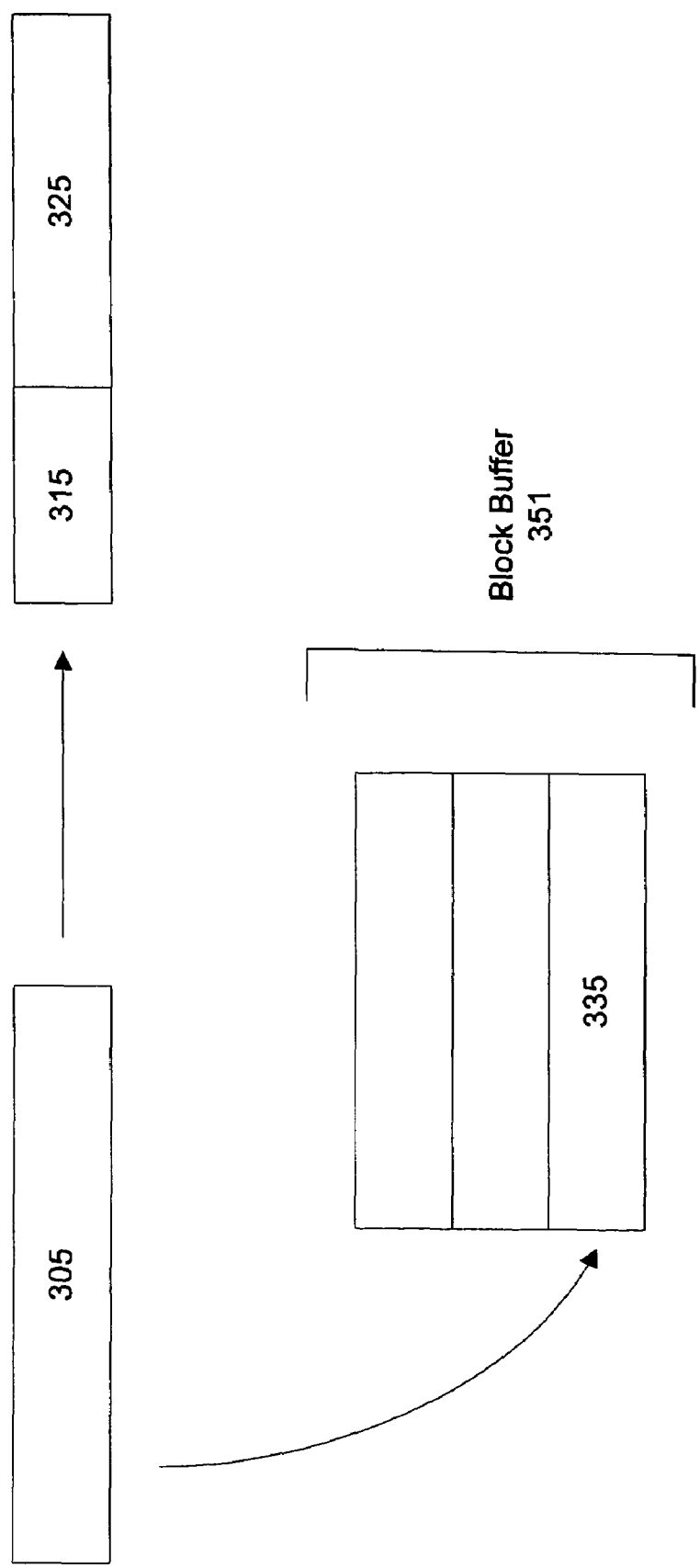

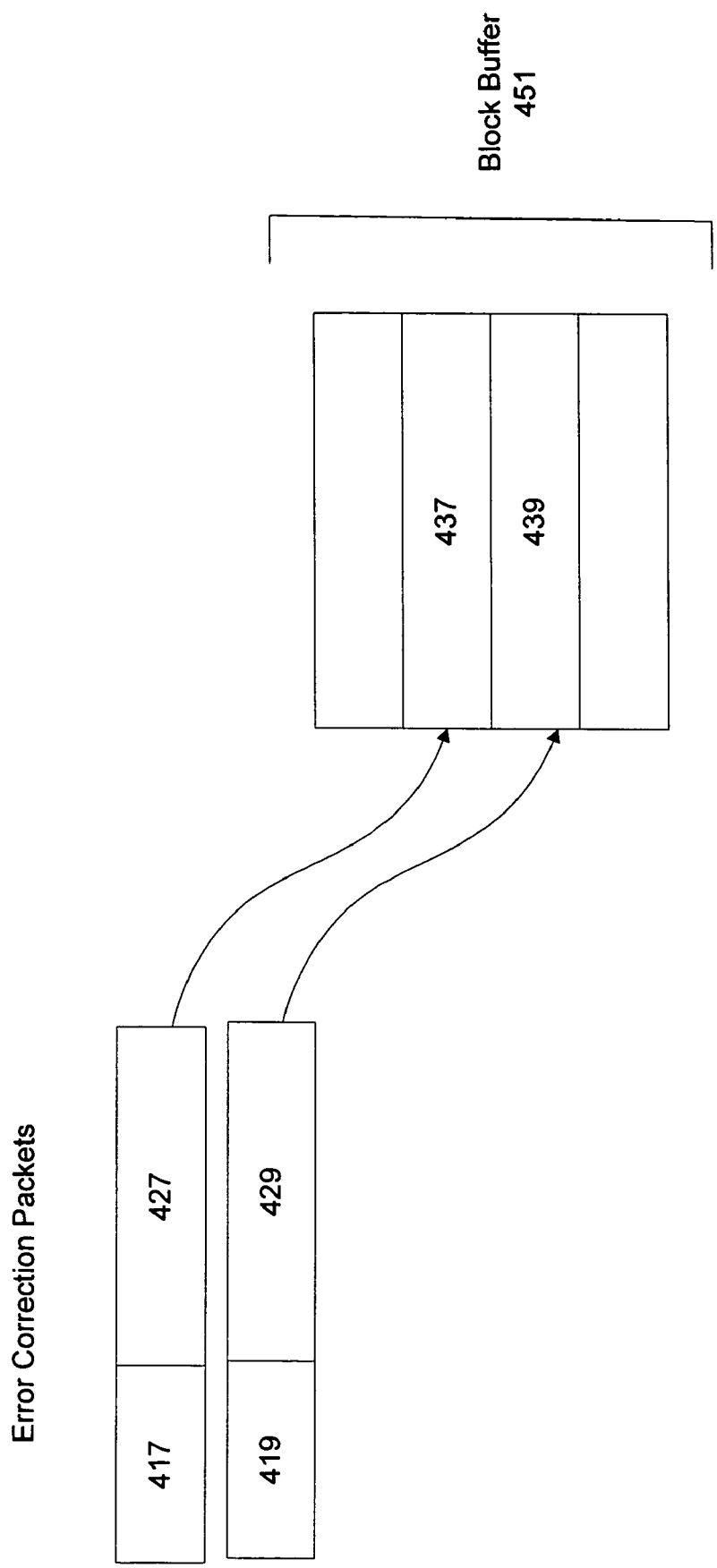

| Session ID 501 | Parity Select 503 | Block ID 505 | Seq. Num. 507 |

Figure 5

FORWARD ERROR CORRECTION IN PACKET NETWORKS

BACKGROUND OF THE INVENTION

1. Field of the Invention

The present invention generally relates to reliable data transport. More specifically, the present invention provides techniques and mechanisms for efficiently and reliably transmitting data in a packet based network.

2. Description of Related Art

Reliable data transport in packet-based networks is a desirable feature. In unicast networks, reliable data transport is typically provided by mechanisms such as the Transmission Control Protocol (TCP). TCP provides for the retransmission of dropped or lost data packets. TCP has been able to provide for sufficient reliability in many types of packet-based networks. However, the techniques of the present invention recognize that there are some limitations to TCP based reliability. For example, TCP based reliability is often insufficient for multicast networks or for delay sensitive networks. Other reliability mechanisms have their own sets of drawbacks. In some examples, reliability mechanisms fail to operate effectively after changes in network topology.

Consequently, it is desirable to provide techniques for improving the mechanisms for allowing reliable data transport.

SUMMARY OF THE INVENTION

Methods and apparatus are provided to allow reliable data transport in a packet-based network. A network node encodes error correction packets associated with data packets at a network-layer and forwards the error correction packets with the data packets. The error correction packets are decoded as needed to recover data packets lost or dropped during transmission. The mechanisms are applicable for unicast and multicast networks and function even with network topology changes.

In one embodiment, a method for reliably transmitting data in a packet network is provided. A plurality of data packets is received at an encoder. Error correction information corresponding to the plurality of data packets is generated. A plurality of error correction packets including the error correction information are provided. The plurality of data packets and the plurality of error correction packets are transmitted to a decoder. The decoder uses error correction information to reconstruct one or more data packets if one or more data packets are not received at the decoder.

In another embodiment, a method for receiving data in a network is provided. A plurality of data packets is received at a decoder network node. The plurality of data packets are associated with a block identifier. A plurality of error correction packets including error correction information corresponding to the block identifier are received. One or more of the data packets are reconstructed using error correction information if one or more of the data packets has not been received within a set time period.

In another embodiment, an apparatus for reliably transmitting data is provided. The apparatus includes an interface and a processor. The interface is configured to receive a plurality of data packets. A processor is configured to generate error correction information corresponding to the plurality of data packets and provide a plurality of error correction packets including the error correction information. The interface is further configured to transmit the plurality of data packets and the plurality of error correction packets to a decoder. The decoder uses error correction information to reconstruct one or more data packets if one or more data packets are not received at the decoder.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIGS. 3A-3D are diagrammatic representations showing transmission of a packet block.

FIGS. 4A-4D are diagrammatic representations showing transmission of a packet block.

FIG. 5 is a diagrammatic representation showing an encoded packet.

DETAILED DESCRIPTION OF SPECIFIC EMBODIMENTS

Figure 1:
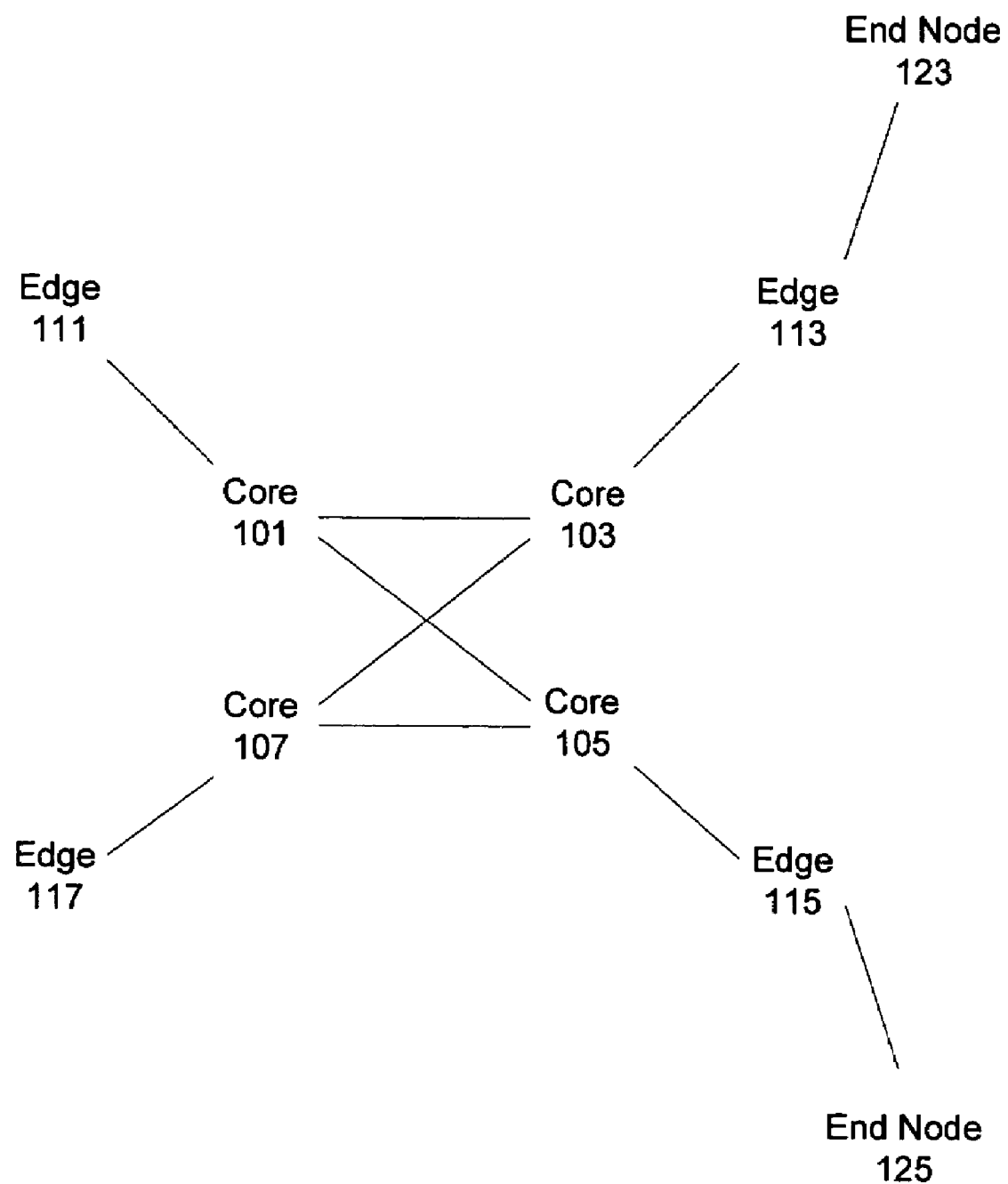
FIG. 1 is a diagrammatic representation of a packet switched network.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the some examples of techniques and mechanisms of the present invention will be described in the context of IP packet delivery. However, it should be noted that the techniques and mechanisms of the present invention can also be applied to other types of packets and data. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Conventional mechanisms for providing reliability in packet based networks are limited. In typical instances, reliability is provided by retransmission mechanisms associated with TCP. However, TCP has considerable drawbacks, particularly for any traffic with retransmission issues. TCP includes mechanisms for retransmitting packets from a source to a destination when the destination recognizes that packets were dropped or lost. For example, a user terminal may request the retransmission of particular packets from a content server. Although these retransmission mechanisms are effective in many circumstances, techniques of the present invention recognize that they are not particularly effective in many situations including the transmission of delay sensitive data and transmission in multicast networks.

For transmission of delay sensitive data such as financial information, video, and telephony, the destination node typically does not have the luxury to wait for the retransmission of dropped packets. Waiting for retransmission would adversely affect system performance. In some instances, waiting for the retransmission of a dropped packet may mean that frames of video are stalled, a telephony conversation is unclear, or a stock quote sequence is outdated.

TCP is also not effective for multicast networks. In a multicast network, many applications communicate to multiple destination simultaneously. It is typically unworkable for a source to retransmit particular dropped packets not received by certain destinations. In typical IP multicast networks, the source does not even know of all the destinations for its transmission.

Furthermore, TCP is a layer 4 protocol, typically controlled by software at network endpoints. TCP cannot be customized for particular links between network nodes and relies on a fairly slow error recovery mechanism.

Mechanisms such as TCP and other even higher layer protocols are not particularly effective for delay sensitive transmissions and multicast networks. One available mechanism, Pragmatic General Multicast (PGM), is a reliable multicast transport protocol that runs over a best effort datagram service such as IP multicast. A session of PGM builds a tree having the source as root, the receivers as leaves, and other network elements as intermediate nodes. In the normal course of a data transfer, the source multicasts sequenced data packets along a path of the tree to the receivers. When a receiver detects missing data packets from the expected sequence, it unicasts repeatedly to the last network element of the path negative acknowledgments (NAKs) containing the sequence number of missing data.

Network elements forward NAKs hop-by-hop to the source using the reverse path, and confirm each hop by multicasting a NAK confirmation (NCF) in response to the child from which the NAK was received. Receivers and network elements stop sending NAKs at the reception of a corresponding NCF. Finally, the source itself receives and confirms the NAK by multicasting an NCF to the group. If the data missing is still in memory, repairs (RDATA) may be provided by the source in response to the NAK. To avoid NAK implosion (prohibitive number of NAK messages), PGM specifies procedures for NAK elimination within network elements in order to propagate just one copy of a given NAK along the reverse of the distribution path. PGM is tied to a particular topology of the multicast tree and builds a PGM tree overlaying the multicast tree. For example, if network topology changes or a particular multicast tree changes, PGM may be rendered inoperable. Furthermore, PGM is not particularly effective for delay sensitive data such as telephony or video.

The techniques and mechanisms of the present invention provide for effective and efficient packet transmission at the network layer. By providing mechanisms for reliability at the network layer, network administrators are given more control over maintaining reliability requirements. Specific portions of a network that are particularly lossy my be provided with more extensive mechanisms for error recovery. The reliability mechanisms can also remain transparent to end users and applications.

According to various embodiments, forward error correction is provided in a packet stream to allow for reliable data transmission. Forward error correction tunnels can be established between network nodes, including core network nodes, edge network nodes, and endpoints to allow the transmission of data packets and error correction packets. The error correction packets include error correction information to allow recovery of data packets not received through the tunnel. According to various embodiments, the techniques of the present invention can be used for both unicast and multicast transmissions and can be implemented in hardware for wire speed forward error correction. Techniques and mechanisms are also independent of network topology changes and can be used with a variety of packet protocols.

FIG. 1 is a diagrammatic representation showing a conventional packetized network such as an IP network. The packetized network includes highly interconnected core routers 101-107 and more loosely connected edge routers 111-117. Any router or switch coupled to three or more other routers can be referred to as a core router. Any router located more on the periphery of a service provider network and typically connected to either a different type of network or a different service provider's network is referred to as an edge router. In some instances, core routers can become edge routers and vice-versa based on changing network topologies. The terms core router and edge router here are merely used for convenience. In many instances, core and edge routers are interchangeable. Furthermore, although the techniques and mechanisms of the present invention will be described in the context of a particular core and edge network, the techniques and mechanisms are equally applicable across different service provider networks and across enterprise networks.

According to various embodiments, an end node 123 is a content server. If the user at end node 125 wishes to access information from an end node 123, the request is transmitted to end node 123 and information is sent as packets to end node 125. The packets typically traverse different routes. In many instances, some packets may be dropped or lost while being transmitted across different edge and core routers. A mechanism such as TCP tracks the receipt of the packets from the content server at end node 125 and sends requests back to end node 123 to retransmit any dropped or lost packets. The end node 123 then typically makes several attempts at retransmission. TCP is a layer four mechanism implemented at particular end points in the network. Any terminal point in a packet network is referred to herein as an end point or end node.

In another example, an end node 125 may request information from a content server associated with another service provider network coupled to edge router 117. The packets may similarly be lost or dropped in transmission from the content server associated with service provider network coupled to edge router 117. An end node 125 may also be the recipient of a multicast transmission. In many instances, a multicast transmission is sent using best effort without regard to the actual receipt of the transmission. Other upper layer mechanisms can also be used to provide reliability but upper layer mechanisms are typically implemented only at the endpoints and are generally not application or user transparent. PGM can also be used but PGM involves significant overhead when topology changes.

Consequently the techniques of the present invention provide for network reliability and error recovery mechanisms that can be established between a variety of different nodes in the network. According to various embodiments, reliability can be established between end points in the network. In one example, reliability can be established between core routers in different service provider networks. In still another example, reliability can be established between edge routers in the same service provider networks. As will be appreciated, the variety of configurations are possible.

Figure 2:
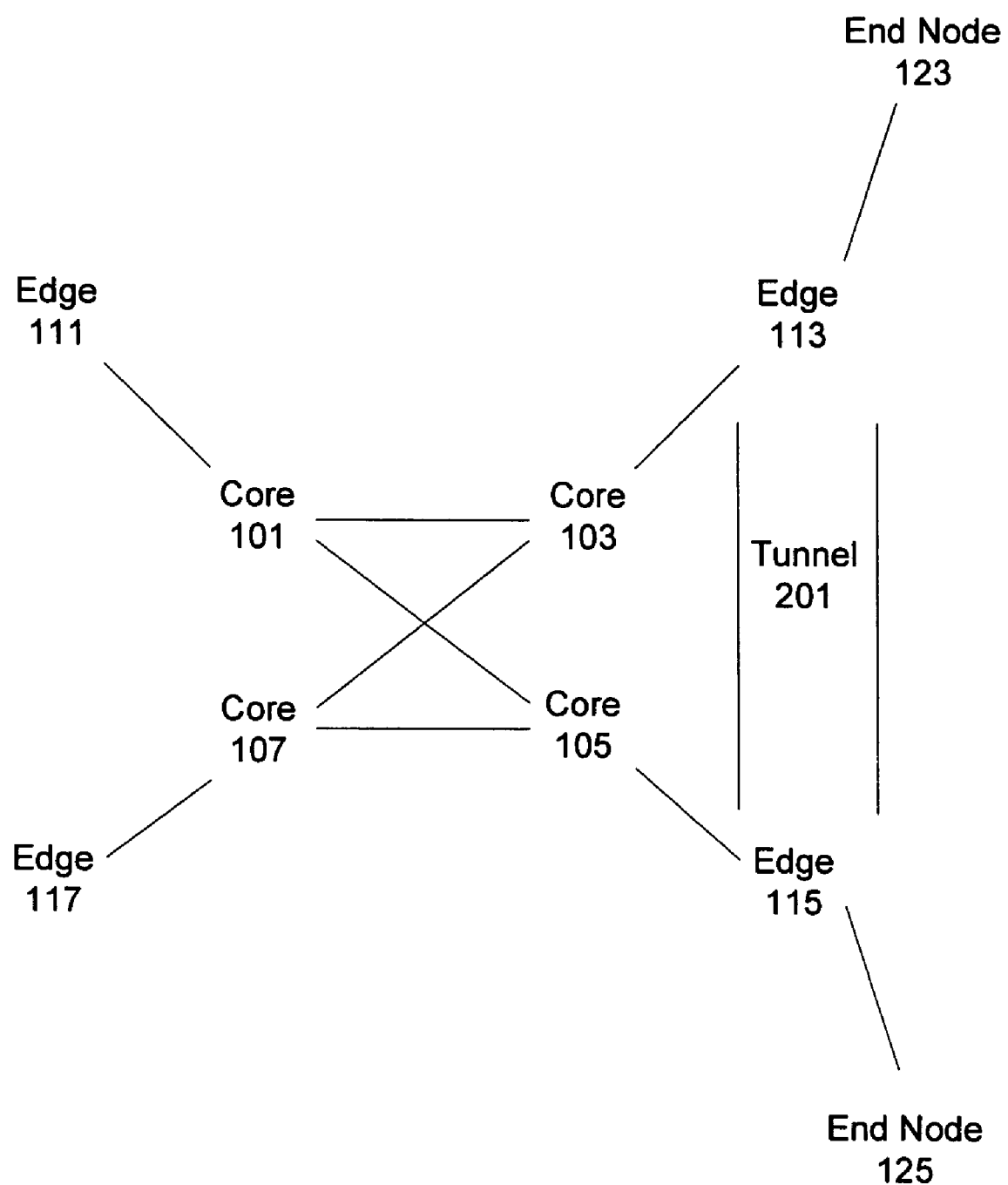
FIG. 2 is a diagrammatic representation showing a tunnel.

FIG. 2 is a diagrammatic representation showing one example of a configuration of a reliable data transport network. The network includes highly interconnected core routers 101-107 and more loosely connected edge routers 111-117. Reliability is established between an edge router 113 and an edge router 115 using a tunnel 101. By setting up an error correction mechanisms such as a forward error correction tunnel 101, network reliability can be established between an edge router 113 and an edge router 115. It will be appreciated that a tunnel here is used merely as an abstraction. Packets may still actually flow through core routers 101-107. The tunnel can be established using a mechanism such as General Routing Encapsulation (GRE). Encryption may or may not be used.

According to various embodiments, a forward error correction tunnel 201 is provided between an edge router 113 and an edge router 115. In one example, an edge router 113 inserts error correction packets into the packet stream transmitted to edge router 115. The error correction packets can be used at edge router 115 to reconstruct lost or dropped packets without the delay associated with retransmission. According to various embodiments, error correction tunnels are established between edge routers 113 and 115, between edge routers 113 and 117, and between edge routers 113 and 111. Error correction tunnels can also be established between edge router 113 and routers in other service provider networks. According to various embodiments, the error correction tunnels can be established by network administrators using mechanisms such as command line interfaces or graphical user interfaces.

The amount of error correction information inserted may depend on the lossiness of the particular routes between the tunnel edge routers. More error correction information may need to be provided for particularly lossy networks. In one embodiment, 25 parity packets are provided for 230 data packets to allow recovery of any 25 lost data packets. The techniques of the present invention recognize that lost data is typically caused by lost or dropped packets and consequently parity or error correction packets are provided. In TCP, parity information is provided within each packet. However, this parity information is not sufficient to allow for error recovery and is typically used to determine if the packet should be dropped. By providing error correction at the network layer, network administrators can configure customized reliability over particular tunnels. In some examples, a network administrator may provide for more error correction packets if a network portion is particularly lossy. In another portion, fewer error correction packets may be used to increase throughput and decrease latency.

Figure 3A:
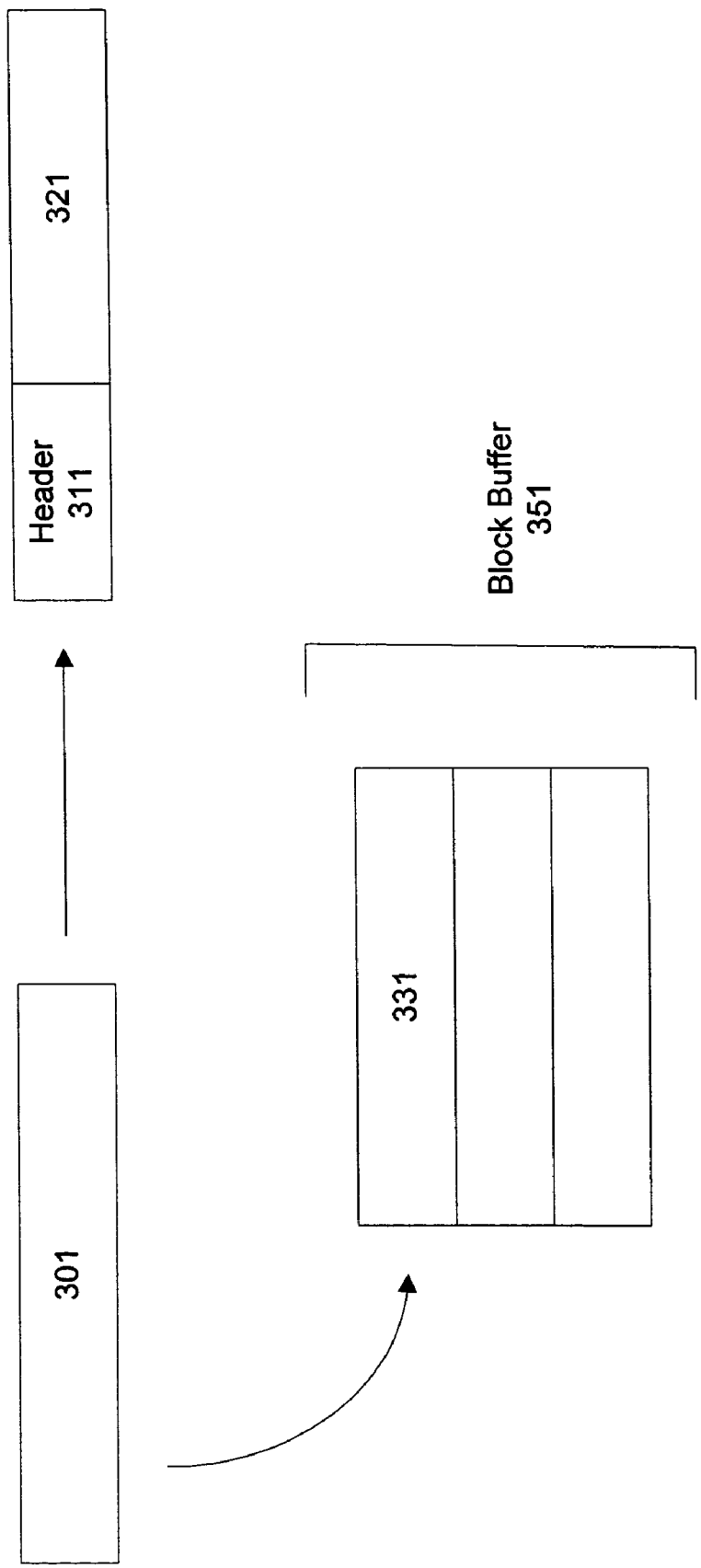

FIG. 3A-3D are diagrammatic representations showing packet processing at a network node inserting error correction information into a packet stream. Any network node inserting error correction information into a packet stream is referred to herein as an encoder. FIG. 3A is a diagrammatic representation showing receipt of a packet. The packet 301 is analyzed to determine if the destination address is associated with any particular forward error correction tunnel or FEC tunnel. If the packet is not associated with any error correction tunnel, the packet may be transmitted without delay. However if the packet is associated with an error correction tunnel, packet 301 is copied into a slot 331 in block buffer 351 based on its block identifier and/or session identifier. A block and/or session identifier can be referred to collectively as a block identifier. In some instances, both identifiers are used. In other instances, only a block identifier is used. According to various embodiments block buffers hold packets destined for a particular destination point.

A block buffer at the encoder is used to maintain information about transmitted packets to allow the generation of the error correction information later when a number of packets have been received. A header 311 is added to the packet 301 and the packet 301 is transmitted as packet 321.

Figure 3B:
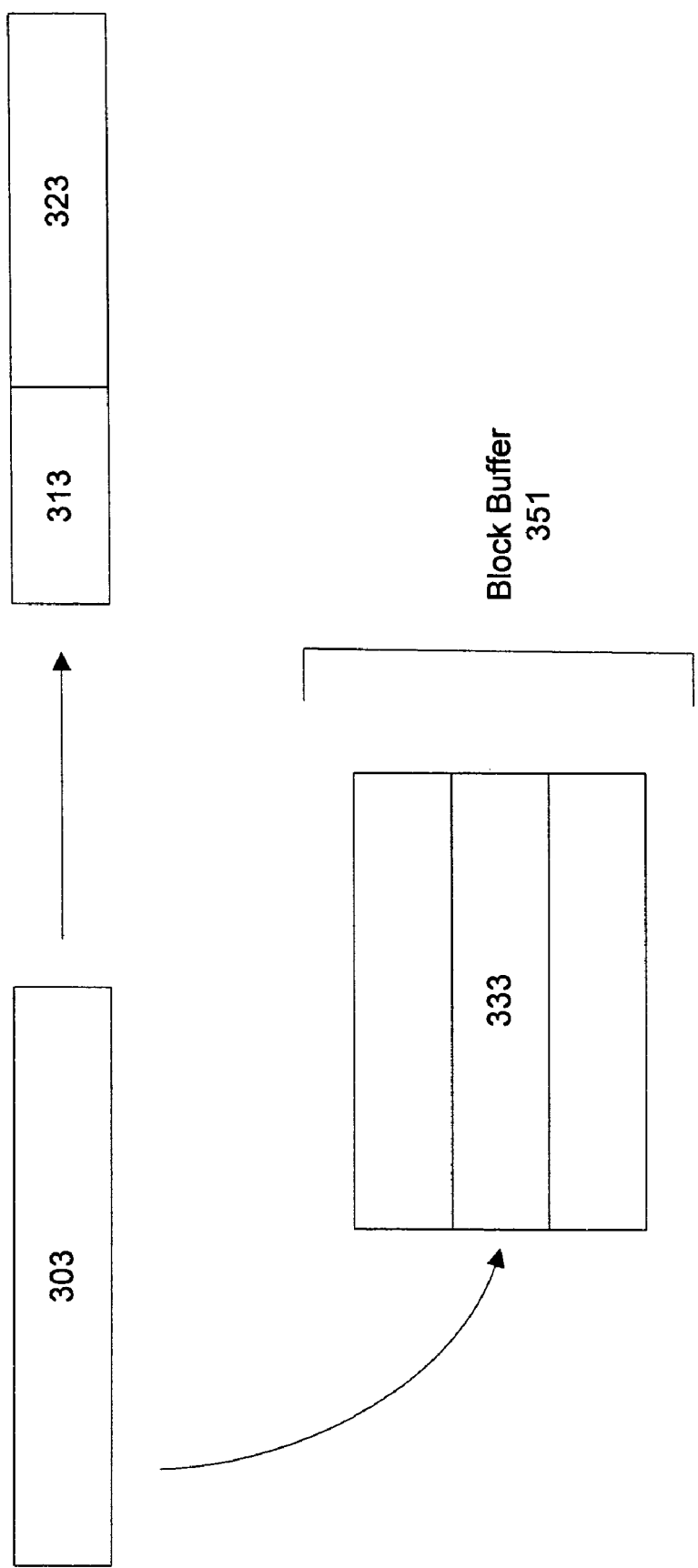

FIG. 3B is a diagrammatic representation showing receipt of a next packet. According to various embodiments, packet 303 is analyzed to determine that it should be copied into block buffer 351 in slot 333. The packet has been forwarded as packet 323 with header 313. FIG. 3C similarly shows a packet 305 copied into a slot 335 in block buffer 351 and forwarded as packet 325 with header 315.

Figure 3D:
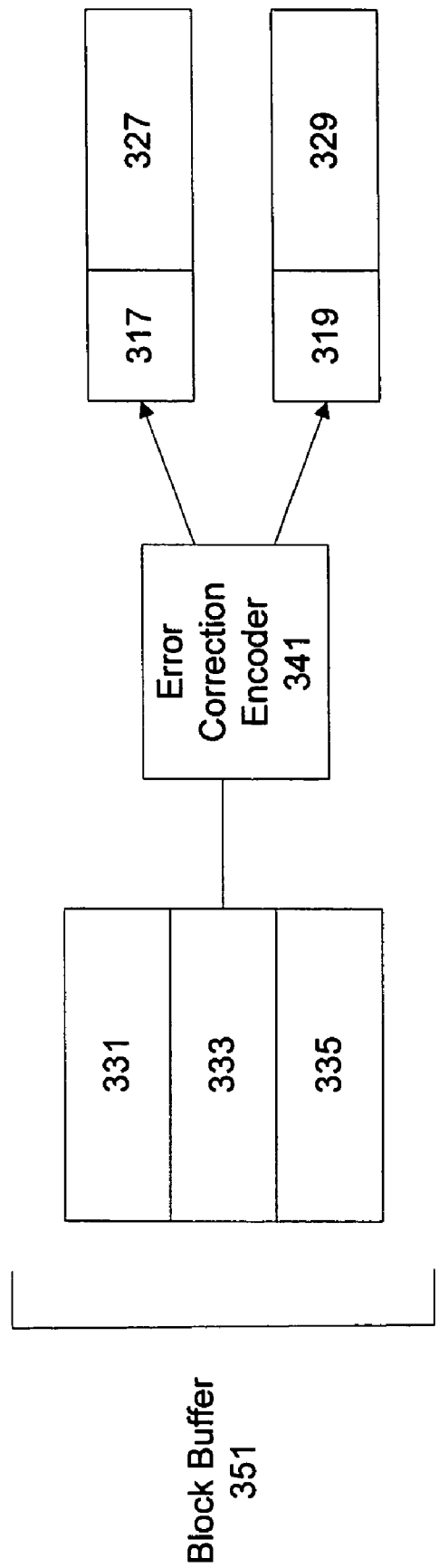

FIG. 3D shows the generation of error correction information. With packet 331, packet 333, and packet 335 saved in the block buffer 351, error correction encoder 341 can generate error correction packets 327 and 329 with headers 317 and 319. According to various embodiments, error correction information is generated using Reed Solomon encoding. It should be noted that other error correction codes like a simple XOR or Wyner-Ash codes can be used as well, and that Reed Solomon coding is just one example used here. The block buffer 351 is used to allow the immediate forwarding of packets as they are received. Any packet containing substantially all error correction information for recovery of data packets is referred to herein as an error correction packet. Other packets transmitted in the network are referred to herein as data packets. Data packets may include some rudimentary parity information.

Figure 4A:
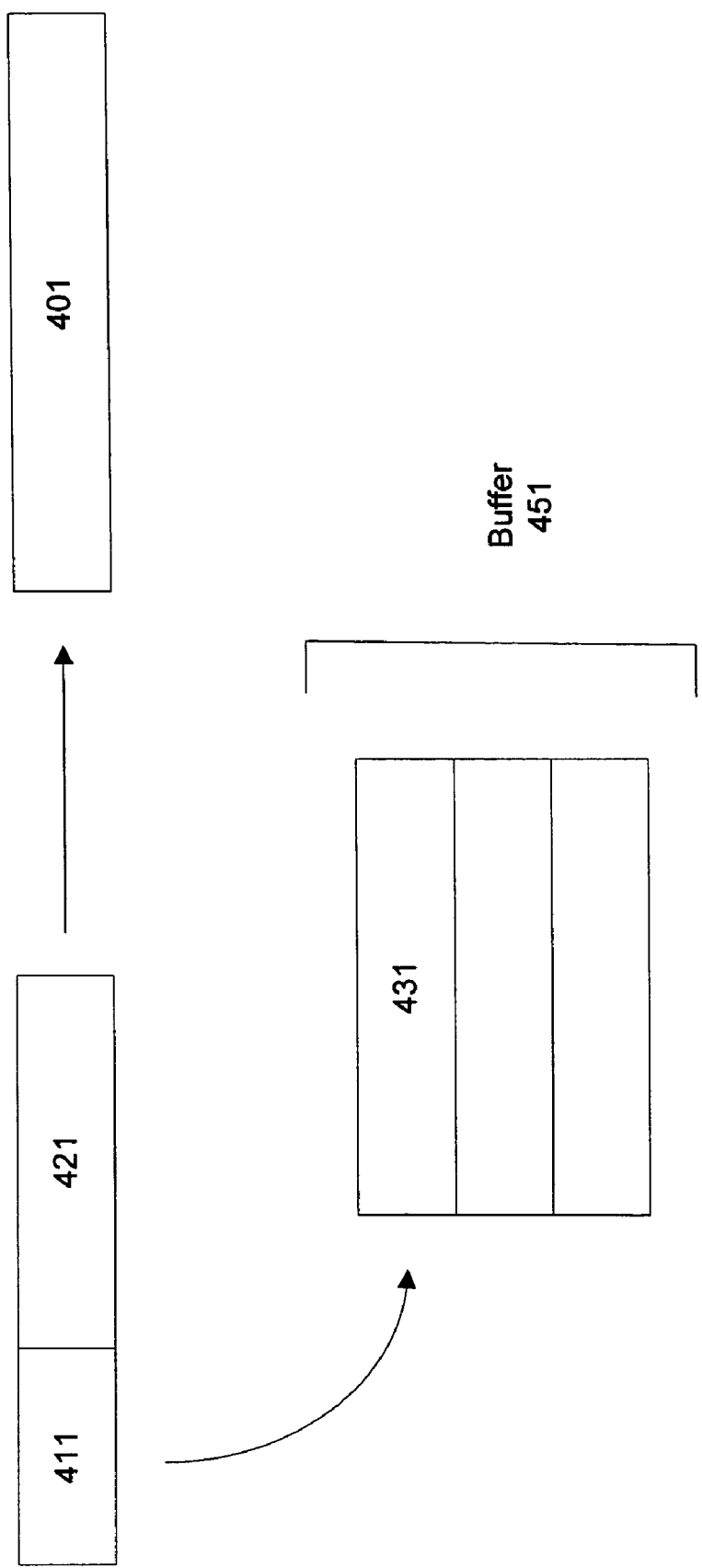

FIG. 4A-4D are diagrammatic representations showing packet processing at a decoder. FIG. 4A shows a packet 421 with a packet header 411. According to various embodiments, any network node configured to receive data packets and error correction packets and reconstruct data packets using error correction packets as needed is referred to herein as a decoder. In some embodiments, a decoder receives packets that do not have a tunnel header. In some examples, when a tunnel header is received, the tunnel header is analyzed to determine the particular block and session identifier. The packet is then copied into the buffer 451 associated with the particular block and session identifier in slot 431. A decoder typically has individual block buffers allocated on a per session and per block basis. Any group of one or more data packets is referred to herein as a block or a packet block. In some examples, the data packets in a block are associated with the same session. The packet portions forwarded as packet 401 with the tunnel header removed.

Figure 4B:
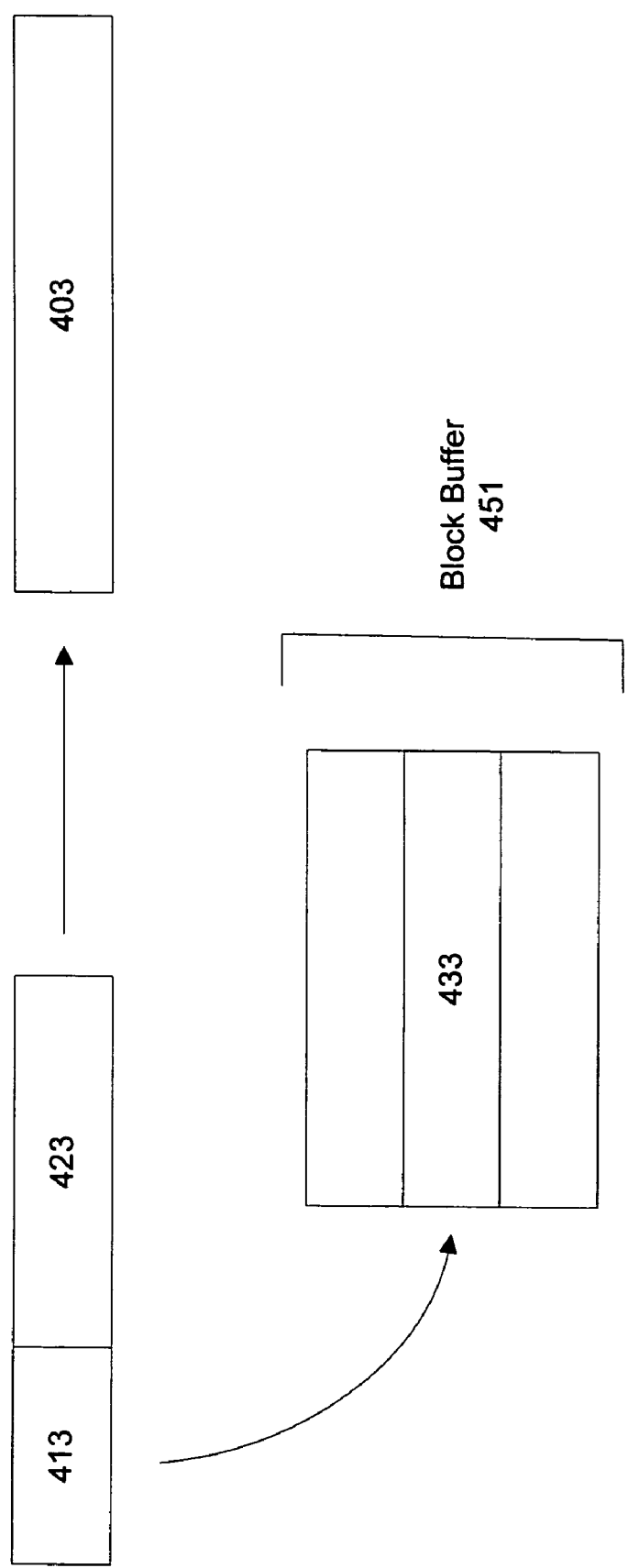

FIG. 4B shows the receipt of another tunnel packet having the same block identifier. The packet 423 is received with header 413. Using the header information, the packet 423 is copied into block buffer 451 in slot 433. The packet is also forwarded as packet 403 with the tunnel header removed. According to various embodiments, the decoder may also be receiving other packets such as packet associated with other block and session identifiers. In many examples, the decoder is also using a timer to track when the first packet was received and also monitoring the number of packets in the block received. That is, the decoder uses a timer to track the amount of time since the first packet in a block buffer was received.

FIG. 4C shows the receipt of error correction packets. Error correction packets 427 and 429 are received with header is 417 and 419 and copied into block buffer slots 437 and 439. In many examples, error correction packets may be received before data packets. However, a decoder will wait a period of time to receive all of the data packets and error correction packets associated with a particular block. If the time elapses, error correction information will be used to reconstruct any missing data packets. For example, a decoder may wait a set number of milliseconds to receive data packets and error correction packets associated with a particular block. The timer typically starts when the first packet is received. If not all data packets are received, error correction packets can be used to reconstruct the lost or dropped data packets. In typical instances, error correction packets are terminated at the decoder.

Figure 4D:
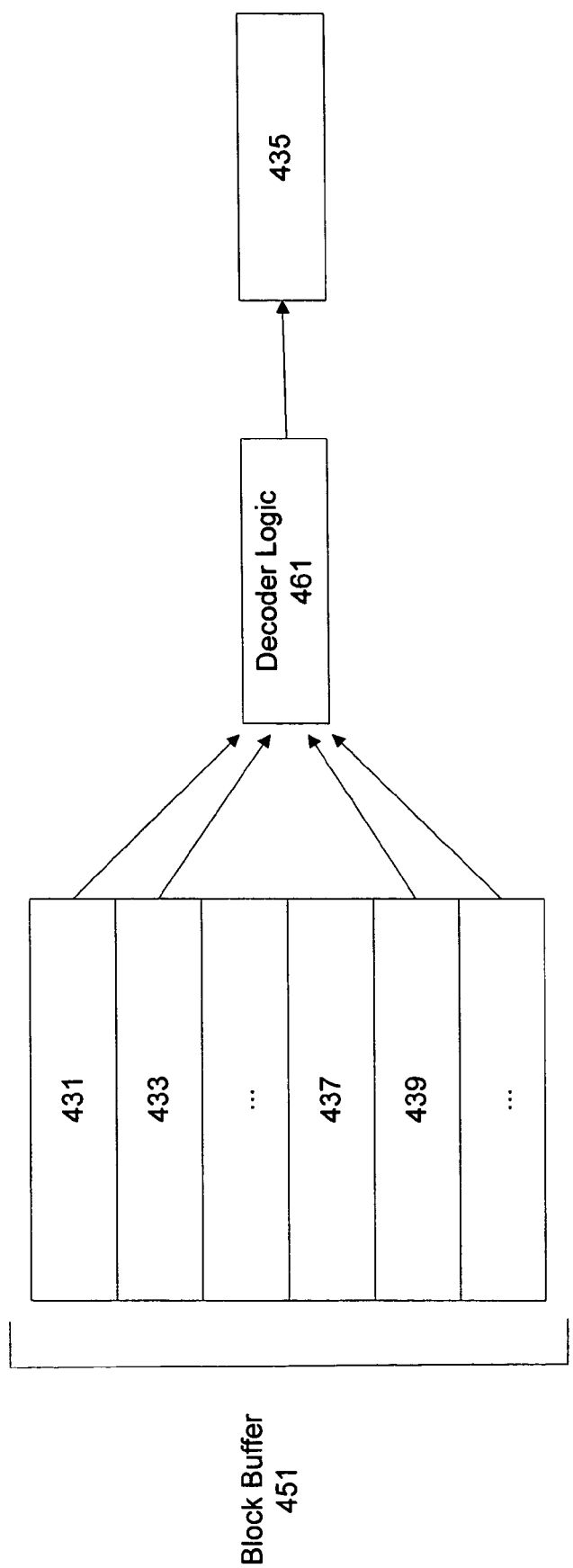

FIG. 4D is a diagrammatic representation showing data packet reconstruction. A block buffer 451 includes data packets 431 and 433 with error correction packets 437 and 439. The data packets and the error correction packets are passed to the decoder logic mechanism to allow application of various reconstruction methodologies. According to various embodiments, decoder logic 461 can apply Reed Solomon error correction to recover lost data packets. The error encoding and decoding protocols can be established during tunnel set-up. The decoder logic can be implemented using an application-specific integrated circuit (ASIC), a programmable device such as a field programmable gate array (FPGA), and/or a general purpose processor, etc. In one embodiment, a reconstruct packet is packet 435. The packet 435 is then forwarded to a next network node.

FIG. 5 is a diagrammatic representation showing a typical header that can be used between two tunnel end points such as an encoder and a decoder. According to various embodiments, a tunnel header used to provide for forward error correction is a standard GRE encapsulation header. In some embodiments, the optional fields included in the tunnel header are used to include information for forward error correction. In one example, a 32-bit forward error correction session ID 501 is used to identify a particular tunnel and session and a 32-bit bit sequence field is partitioned to include a one-up forward error correction parity select bit 503, a 10-bit block identifier 505, and a 21-bit sequence number 507. In many embodiments, the session ID, the block ID, and the sequence number are continuously increasing integers with wrap around. In one embodiment, the parity select bit is set to one for parity packets or error correction packets and zero for data packets.

Figure 6:
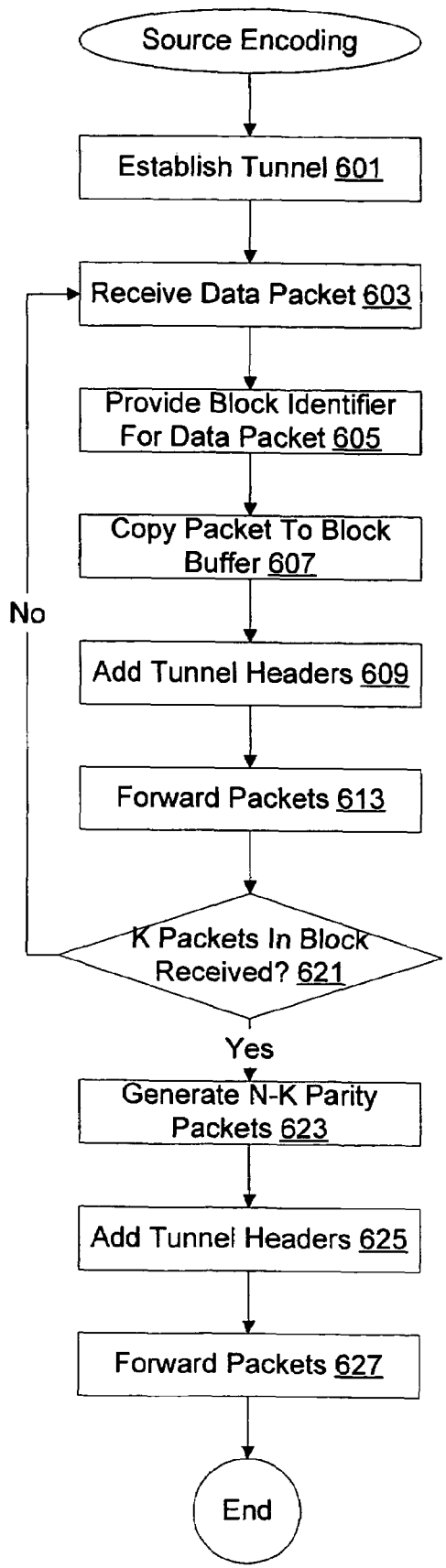
FIG. 6 is a process flow diagram showing a technique for source encoding.

FIG. 6 is a flow process diagram showing a technique for encoding error correction information. At 601, the tunnel is established. According to various embodiments, a GRE tunnel is established. At 603, a packet is received. At 605, a block identifier associated with the packet is provided. According to various embodiments, the block identifier is provided based on the destination associated with packet. At 607, the packet is copied into a packet buffer. At 609, tunnel headers are added to the packet. In many instances, the tunnel header includes a block number, a session identifier, and a sequence number. At 613, the packet is forwarded. The process then repeats at 603 until a certain number of packets such as K packets have been forwarded at 621. After K packets have been forwarded, (N–K) parity packets or error correction packets are generated at 623 to provide a total of N packets for the particular block. At 625, tunnel headers are added to the parity packets and forwarded at 627. In one example, the encoder waits to receive 124 data packets before generating four parity packets for a total of 128 packets in a particular block. According to various embodiments, four parity packets allow reconstruction of up to four lost data packets.

Figure 7:
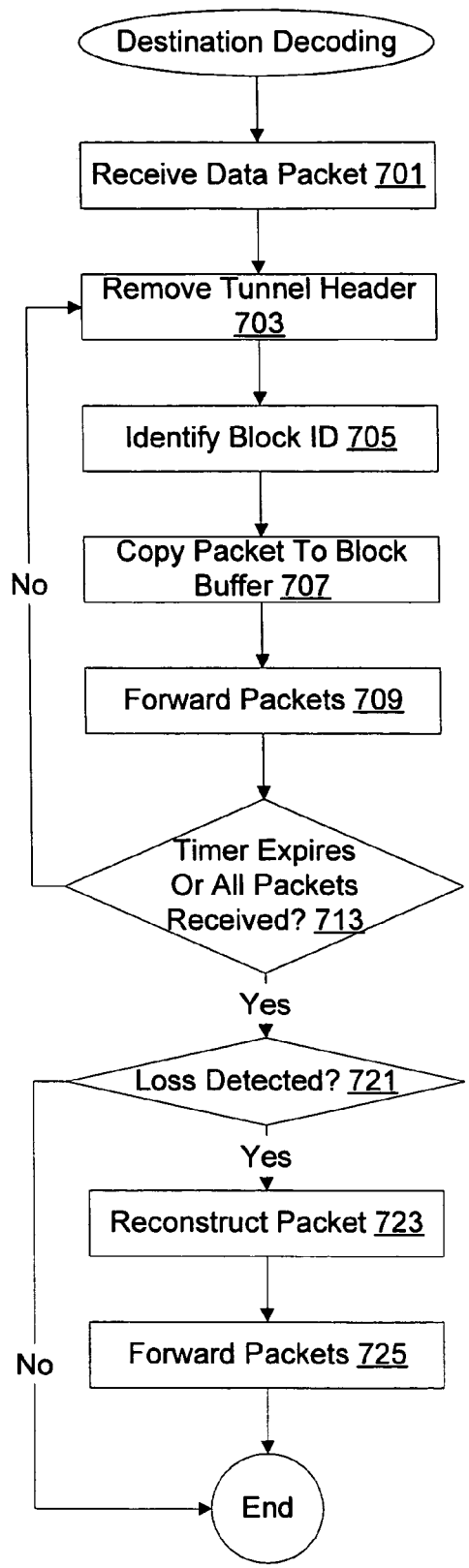
FIG. 7 is a process flow diagram showing a technique for destination decoding.

FIG. 7 is a flow process diagram showing decoder processing upon receiving data packets and error correction packets. At 701, a data packet is received. At 703, the tunnel header is removed. At 705, the block and session identifier is determined to allow copying of the packet into the appropriate block buffer at 707. According to various embodiments, if the packet is the first packet in a particular block received, a timer is started. At 709, the packet is forwarded. The process then repeats at 701 until either the timer has expired or all of the data packets associated with the block have been received. At 721, if no loss is detected, no regeneration is necessary. However, if packets were lost or dropped, data packets are reconstructed at 723 using error correction packets. At 725, reconstructed packets are transmitted.

The techniques and mechanisms of the present invention can be implemented on a variety of devices. In one example, techniques and mechanisms can be implemented in software, firmware, or hardware on an edge router. In one example, in edge router may be implemented on a single system on a chip.

A software or software/hardware hybrid implementation of the techniques of the present invention may be implemented on a general-purpose programmable machine selectively activated or reconfigured by a computer program stored in memory. Such programmable machine may be a network device designed to handle network traffic, such as, for example, a router or a switch. For example, the mapping mechanism of the present invention may be specially configured routers or servers such as specially configured router models 1600, 6500, 7600 and 12000 available from Cisco Systems, Inc. of San Jose, Calif. A general architecture for some of these machines will appear from the description given below. In an alternative embodiment, techniques may be implemented on a general-purpose network host machine such as a personal computer or workstation. Further, the invention may be at least partially implemented on a card (e.g., an interface card) for a network device or a general-purpose computing device.

Figure 8:
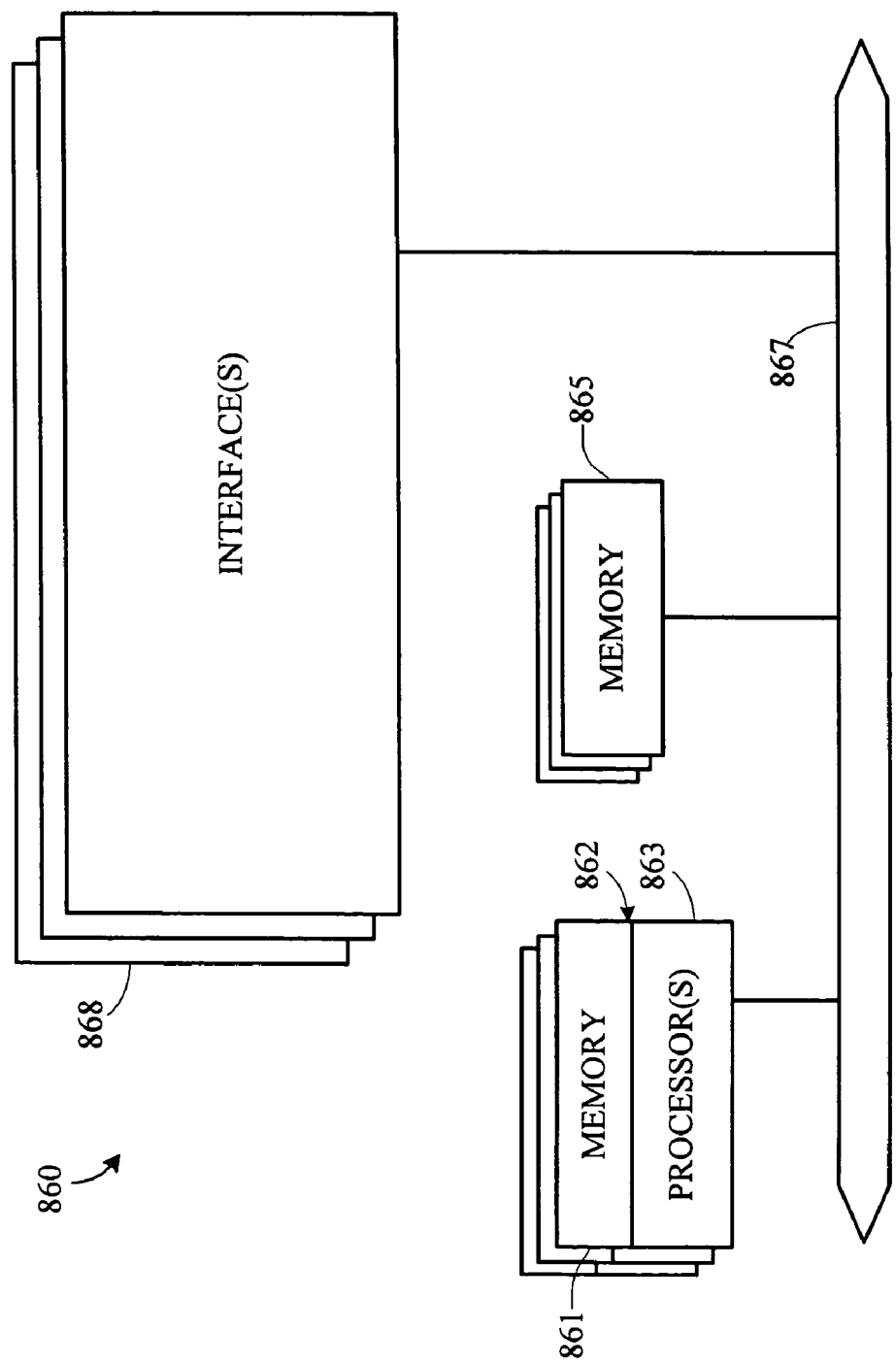
FIG. 8 is a diagrammatic representation showing a router.

Referring now to FIG. 8, a network device 860 suitable for implementing the techniques of the present invention includes a master central processing unit (CPU) 862, interfaces 868, and a bus 867 (e.g., a PCI bus) or an interconnect. When acting under the control of appropriate software or firmware, the CPU 862 may be responsible for implementing specific functions associated with the functions of a desired network device. For example, the CPU 862 may be responsible for removing tags, determining services associated with tags, and replacing tags with other forms of header information. The CPU 862 preferably accomplishes all these functions under the control of software including an operating system, and any appropriate applications software.

CPU 862 may include one or more processors 863 such as a processor from the Motorola family of microprocessors or the MIPS family of microprocessors. In an alternative embodiment, processor 863 is specially designed hardware for controlling the operations of network device 860. In a specific embodiment, a memory 861 (such as non-volatile RAM and/or ROM) also forms part of CPU 862. However, there are many different ways in which memory could be coupled to the system. Memory block 861 may be used for a variety of purposes such as, for example, caching and/or storing data, programming instructions, etc.

The interfaces 868 are typically provided as interface cards (sometimes referred to as "line cards"). Generally, they control the sending and receiving of data packets over the network and sometimes support other peripherals used with the network device 860. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

A network device can include one or more memory modules (such as, for example, memory block 865) configured to store data, program instructions for the general-purpose network operations and/or other information relating to the functionality of the techniques described herein. The program instructions may control the operation of an operating system and/or one or more applications, for example. The memory or memories may also be configured to store data structures, mapping tables, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. Therefore, the scope of the invention should be determined with reference to the appended claims.

What is claimed is:

1. A method comprising:
 receiving a plurality of data packets at an encoder associated with a first network node for transmission to a decoder associated with a second network node;
 determining an amount of loss associated with transmission between the first network node and the second network node;
 establishing a forward error correction tunnel between the encoder and the decoder;
 generating error correction information corresponding to the plurality of data packets, wherein the amount of error correction information generated is based at least partially upon the amount of loss and wherein the error correction information is included in a plurality of error correction packets;
 transmitting the plurality of data packets and the plurality of error correction packets to the decoder.

2. The method of claim 1, wherein the decoder is associated with a network end-point.

3. The method of claim 1, wherein the encoder is associated with a network end-point.

4. The method of claim 1, wherein the decoder and the encoder are associated with edge switches.

5. The method of claim 1, wherein Reed-Solomon encoding is used to generate error correction information.

6. The method of claim 1, wherein the encoder provides reliability at the network layer.

7. The method of claim 1, wherein the network is a unicast network.

8. The method of claim 1, wherein the network is a multicast network.

9. The method of claim 1, wherein the plurality of data packets are transmitted before the error correction information is generated.

10. The method of claim 9, wherein data packets are copied into a buffer and transmitted as they are received.

11. The method of claim 1, further comprising encapsulating the plurality of data packets and the plurality of error correction packets with a tunnel header.

12. The method of claim 11, wherein the tunnel header is a GRE encapsulated tunnel header.

13. The method of claim 11, wherein the plurality of data packets and the plurality of error correction packets are associated with a session.

14. A method comprising:
 receiving a plurality of data packets at a decoder network node, the plurality of data packets associated with a block identifier;
 receiving a plurality of error correction packets including error correction information corresponding to the block identifier, wherein the plurality of error correction packets are received over an error correction tunnel between an encoder and the decoder, wherein the number of error correction packets received is based at least partially on the amount of loss determined for transmissions between the encoder and the decoder.

15. The method of claim 14, further comprising removing tunnel header information from the plurality of data packets.

16. The method of claim 14, further comprising forwarding the plurality of data packets to a network end-point.

17. The method of claim 14, wherein the error correction information is Reed-Solomon encoded.

18. The method of claim 14, further comprising setting a timer upon receiving the first of a plurality of data packets associated with the block identifier.

19. An apparatus for reliably transmitting data, the apparatus comprising:
an interface configured to receive a plurality of data packets;
a processor configured to generate error correction information corresponding to the plurality of data packets and provide a plurality of error correction packets including the error correction information;
wherein the interface is further configured to transmit the plurality of data packets and the plurality of error correction packets to a decoder, wherein the interface is configured to establish one or more forward error correction tunnels between the encoder and the decoder, wherein the number of error correction packets transmitted is based at least partially on the amount of loss determined for transmissions between the encoder and the decoder.

20. The apparatus of claim 19, wherein the plurality of data packets are transmitted before the error correction information is generated.

21. The apparatus of claim 20, wherein data packets are copied into a buffer and transmitted as they are received.

22. An apparatus for reliably transmitting data in a packet network, the apparatus comprising:
means for receiving a plurality of data packets at an encoder associated with a first network node for transmission to a decoder associated with a second network node;
means for determining an amount of loss associated with transmission between the first network node and the second network node;
means for establishing a forward error correction tunnel between the encoder and the decoder;
means for generating error correction information corresponding to the plurality of data packets, wherein the amount of error correction information generated is based at least partially upon the amount of loss and wherein the error correction information is included in a plurality of error correction packets;
means for transmitting the plurality of data packets and the plurality of error correction packets to the decoder.

23. The apparatus of claim 22, wherein the plurality of data packets are transmitted before the error correction information is generated.

24. The apparatus of claim 23, wherein data packets are copied into a buffer and transmitted as they are received.

* * * * *